(12) United States Patent
Hashimoto

(10) Patent No.: US 8,351,813 B2
(45) Date of Patent: Jan. 8, 2013

(54) POWER SUPPLY CONTROL FOR SWITCHING A STATE OF SUPPLY OF ELECTRIC POWER

(75) Inventor: Minoru Hashimoto, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1034 days.

(21) Appl. No.: 12/165,283

(22) Filed: Jun. 30, 2008

(65) Prior Publication Data
US 2009/0010671 A1 Jan. 8, 2009

(30) Foreign Application Priority Data
Jul. 5, 2007 (JP) ................................. 2007-177557

(51) Int. Cl.
*G03G 15/00* (2006.01)
*G06F 1/00* (2006.01)
(52) U.S. Cl. .......................................... 399/88; 713/324
(58) Field of Classification Search .................... 399/37, 399/70, 88; 713/320, 322, 324
See application file for complete search history.

(56) References Cited

U.S. PATENT DOCUMENTS

2005/0138447 A1* 6/2005 Kobayashi et al. ........... 713/300
2007/0061601 A1* 3/2007 Park .............................. 713/300

FOREIGN PATENT DOCUMENTS

JP 2004-157961 6/2004
JP 2006-173695 A 6/2006

* cited by examiner

*Primary Examiner* — Walter L Lindsay, Jr.
*Assistant Examiner* — Billy J Lactaoen
(74) *Attorney, Agent, or Firm* — Fitzpatrick, Cella, Harper & Scinto

(57) ABSTRACT

The device comprises a first power supply 204 supplying electric power in the normal mode, a second power supply 203 supplying electric power in the power-saving mode, a first switching unit 211 switching between supplying and stopping the supply of electric power from an external power supply to the first power supply, a second switching unit 502 switching between supplying and stopping the supply of electric power outputted from the first power supply 204, a control unit controlling the first switching unit 211 and second switching unit 501 using electric power supplied from the second power supply. In the power-saving mode, the first switching unit stops the supply of electric power from the external power supply to the first power supply.

8 Claims, 13 Drawing Sheets

PRIOR ART

PRIOR ART

F I G. 4
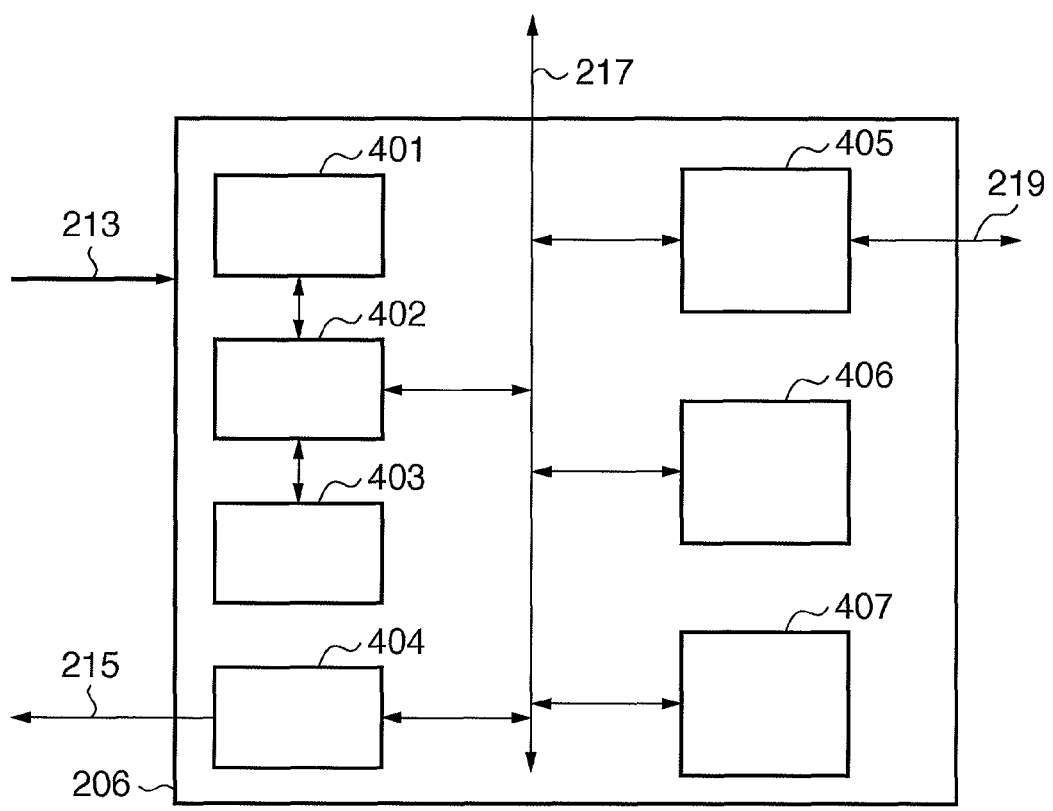

FIG. 12

| INPUT TO SELECTOR 601 | | OUTPUT FROM SELECTOR 601 | | STATUS OF MFP 101 |
|---|---|---|---|---|
| OUTPUT OF LATCH 306 | OUTPUT OF TIMER 602 | MECHANICAL RELAY CONTROL SIGNAL 212 | SEMICONDUCTOR RELAY CONTROL SIGNAL 502 | |
| INACTIVE | DON'T CARE | ACTIVE | ACTIVE | NORMAL MODE |
| ACTIVE | INACTIVE | ACTIVE | INACTIVE | POWER-SAVING MODE (INTERMEDIATE MODE) |
| ACTIVE | ACTIVE | INACTIVE | INACTIVE | POWER-SAVING MODE (MINIMUM POWER MODE) |

F I G. 13

| | | STORED VALUES | CALCULATION METHOD | FEATURES |
|---|---|---|---|---|
| 1 | COUNTING FOR FIXED TIME PERIOD AFTER PREVIOUS POWER-ON OF RELAY | (1) PREVIOUS MOMENT WHEN RELAY WAS TURNED ON.<br>(2) MINIMUM TIME (USUALLY A FIXED VALUE), DURING WHICH RELAY IS TURNED ON. | (a) VALUE OBTAINED BY SUBTRACTING (1) AND (2) FROM CURRENT MOMENT.<br>(b) "0" IF NEGATIVE. | SAME AS FIRST EMBODIMENT. THE FIXED TIME PERIOD MAY BE VARIED DEPENDING ON TIME ZONE, DAY OF THE WEEK, ETC. MARGINS AFFECTING RELAY LIFE ACCUMULATE. |
| 2 | COUNTING FOR FIXED TIME PERIOD SINCE N-TH PREVIOUS POWER-ON OF RELAY | (3) MOMENT OF N-TH PREVIOUS POWER-ON OF RELAY.<br>(4) MINIMUM TIME (FIXED VALUE), DURING WHICH RELAY IS TURNED ON. | (c) VALUE OBTAINED BY SUBTRACTING (3) AND N_(4) FROM CURRENT MOMENT.<br>(d) "0" IF NEGATIVE. | IN MANY CASES, MARGIN ACCUMULATION IS SMALLER IN COMPARISON WITH 1. |
| 3 | SETTING NUMBER OF TIMES RELAY CAN BE DISCONNECTED OVER A FIXED PERIOD OF TIME TO WITHIN A FIXED VALUE | (5) NUMBER OF TIMES RELAY IS TURNED ON OVER A PREDETERMINED TIME PERIOD.<br>(6) MAXIMUM VALUE (USUALLY A FIXED VALUE) FOR POWER-ONS OF RELAY OVER A FIXED TIME PERIOD.<br>(7) PREVIOUS MOMENT, AT WHICH RELAY WAS TURNED ON.<br>(8) PERIOD (USUALLY A FIXED VALUE), DURING WHICH NUMBER OF POWER-ONS OF MECHANICAL RELAY 211 IS COUNTED. | (e) COMPARE (7) WITH CURRENT MOMENT, IF FIXED PERIOD HAS PASSED, CLEAR VALUE OF (5).<br>(f) IF (5)<(6), SET TO "0".<br>(g) IF (5)≥(6), SET TO A VALUE OBTAINED BY SUBTRACTING CURRENT MOMENT FROM TIME WHEN FIXED PERIOD ENDS. | THE FIXED TIME PERIOD IS SET, FOR INSTANCE, TO 1 HOUR OR 1 DAY. IN SOME CASES, NO TRANSITION TO MINIMUM-POWER POWER-SAVING MODE TAKES PLACE FOR AN EXTENDED PERIOD OF TIME. THE PERIOD AND NUMBER OF DISCONNECT TIMES MAY BE RENDERED VARIABLE DEPENDING ON CUMULATIVE NUMBER OF RELAY POWER-ONS. |
| 4 | CALCULATING POSSIBLE DISCONNECT TIME PERIOD BASED ON CUMULATIVE NUMBER OF POWER-ONS | (9) TIME OF INITIAL POWER-ON.<br>(10) CUMULATIVE NUMBER OF RELAY POWER-ONS.<br>(11) TIME TABLE FOR NUMBER OF RELAY POWER-ONS OR RELAY POWER-ON INTERVAL. | (h) CALCULATE NEXT TIME OF POSSIBLE DISCONNECT BASED ON CUMULATIVE NUMBER OF RELAY POWER-ONS (TABLE OR FORMULA).<br>(i) SUBTRACT VALUE OF (9) AND VALUE OF (H) FROM CURRENT MOMENT.<br>(j) SET TO "0" IF NEGATIVE. | HAS THE ADVANTAGE THAT, WHEN CUMULATIVE NUMBER OF RELAY POWER-ONS IS SMALL, EVEN IF OPERATION IN THE NORMAL MODE LASTS A SHORT TIME, A TRANSITION TO THE MINIMUM-POWER POWER-SAVING MODE CAN BE MADE FROM THE VERY BEGINNING. IF IT IS LARGE, CAN BE CONFIGURED SO AS TO AVOID EXCESSIVE MARGINS. |

POWER SUPPLY CONTROL FOR SWITCHING A STATE OF SUPPLY OF ELECTRIC POWER

BACKGROUND OF THE INVENTION

1. Field of the Invention

The present invention relates to a power supply control apparatus with a power-saving mode, a power supply control method, and a power supply control software program.

2. Description of the Related Art

Devices having a power-saving mode have been known in the past. For instance, devices exist in which, in order to lower power consumption as much as possible in the power-saving mode, only the section detecting triggers for returning to the normal mode from the power-saving mode is energized and the supply of electric power to other sections is stopped.

On the other hand, as a reflection of the rising demand for power reduction in the power-saving mode, it is common to provide a switch on the commercial (external) power supply input side (called the "AC-side" below) to disconnect the circuit when stopping the supply of electric power to sections other than the trigger detecting section. The reason is that, in a situation wherein the AC side is connected to a power supply unit, power consumption within the power supply unit takes place when the output-side circuitry of the power supply unit is disconnected. For instance, a mechanical relay capable of handling large currents at low cost have been used as a switch for disconnecting AC-side electrical power (Japanese Patent Laid-Open No. 2004-157961).

On the other hand, with the advancement of communication technology, in devices connected to a network, there is an increase in the number of packets requiring response in a power-saving mode. It is conspicuous in situations, wherein the network includes numerous monitoring servers and client PCs sending out regular status request packets and the like generated by monitoring software, etc. For such packets, corresponding processing has to be performed by coming out of the power-saving mode. This creates the problem that the number of times the switch is tuned on and off increases and the life of the switch becomes shorter than the life of the device.

An effective method of prolonging the life of the switch consists in maintaining a standby state without transitioning to the power-saving mode from the normal mode for a fixed time period (e.g. 15 min) even if packet processing is completed within a shorter time. However, a problem existed in that power consumption increased in proportion to the delay in transition from the normal mode to the power-saving mode.

SUMMARY OF THE INVENTION

The present invention provides a technology enabling further reduction in power consumption while ensuring the useful life of the switch used for switching to the power-saving mode.

One aspect of the present invention provides a power supply control apparatus having a first power supply configured to supply electric power in a first power mode, a second power supply configured to supply electric power in a second power mode, in which the supply of electric power from the first power supply is stopped, a first switching unit configured to switch the state of supply of electric power from an external power supply to the first power supply, a second switching unit configured to switch the state of supply of electric power outputted from the first power supply and a control unit configured to operate on electric power supplied from the second power supply and exercise turn-on control or turn-off control over the first switching unit and the second switching unit, wherein, in the first power mode, in response to generation of a factor causing a transition to the second power mode, the control unit causes the power supply control apparatus to transition to the second power mode by controlling the second switching unit so as to turn off while controlling the first switching unit so as to turn on, and wherein, in the second power mode, in response to generation of a factor causing a return to the first power mode, the control unit causes the power supply control apparatus to return to the first power mode by controlling the first switching unit and second switching unit so as to turn on, with the first switching unit controlled so as to turn off in response to satisfaction of a predetermined condition after transition to the second power mode.

Another aspect of the present invention provides a power supply control method used in a power supply control apparatus having a first power supply configured to supply electric power in a first power mode; a second power supply configured to supply electric power in a second power mode, in which the supply of electric power from the first power supply is stopped; a first switching unit configured to switch the state of supply of electric power from an external power supply to the first power supply; a second switching unit configured to switch the state of supply of electric power outputted from the first power supply; and a control unit configured to operate on electric power supplied from the second power supply and exercise turn-on control or turn-off control over the first switching unit and second switching unit, the method comprises during power supply control apparatus operation in the first power mode, in response to generation of a factor causing a transition to the second power mode, causing the power supply control apparatus to transition to the second power mode by causing the control unit to control the second switching unit so as to turn off while controlling the first switching unit so as to turn on during power supply control apparatus operation in the second power mode, in response to generation of a factor causing a return to the first power mode, causing the power supply control apparatus to return to the first power mode by causing the control unit to control the first switching unit and second switching unit so as to turn on and causing the control unit to control the first switching unit so as to turn off in response to satisfaction of a predetermined condition after transition to the second power mode.

Further features of the present invention will be apparent from the following description of exemplary embodiments with reference to the attached drawings.

BRIEF DESCRIPTION OF THE DRAWINGS

FIG. 4 is a diagram illustrating the configuration of a system controller 206.

FIG. 12 is a diagram illustrating an input/output relationship in a selector 601 in the first embodiment.

FIG. 13 is a diagram illustrating algorithms used for computing counter values in the second embodiment and their characteristics.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

System Overview

Figure 1:
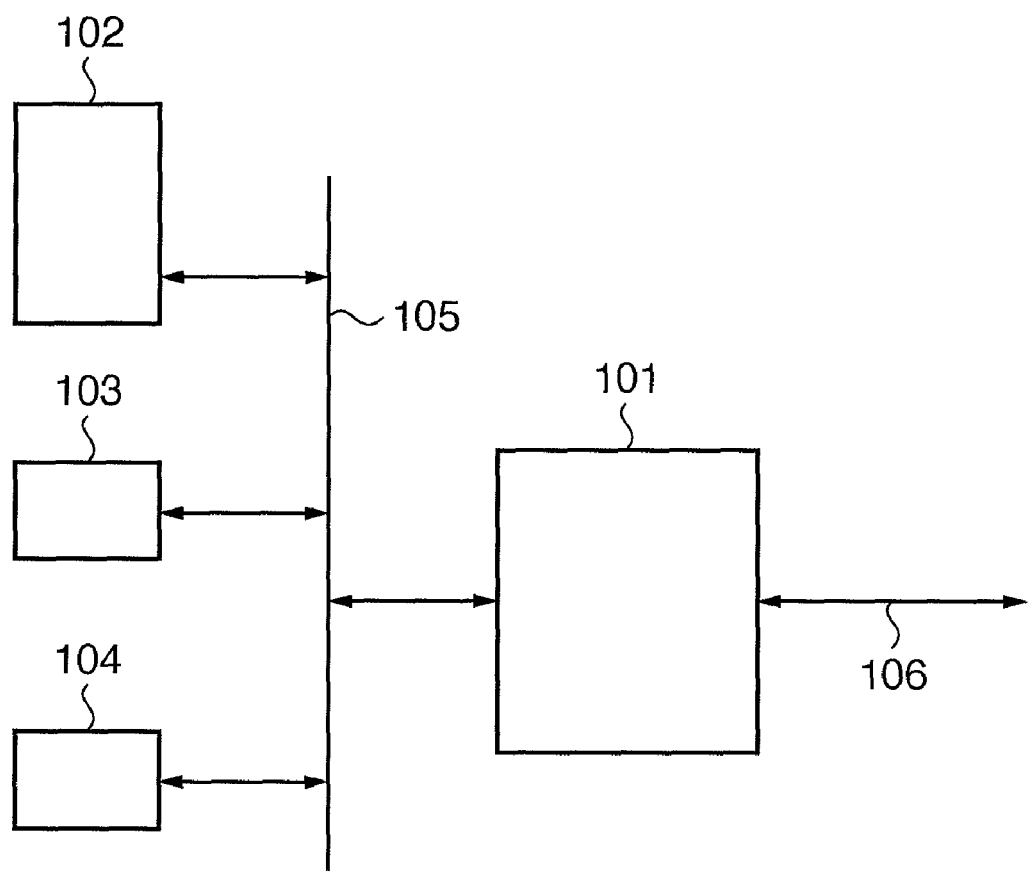
FIG. 1 is a diagram illustrating a system used in the embodiments of the present invention in its entirety.

FIG. 1 is a schematic view of a system comprising a multifunction peripheral (called "MFP" below) 101, in which the power supply control apparatus of the first embodiment of the present invention can be applied.

The MFP 101 is connected to a network 105, such as an Ethernet, etc., as well as to a public line 106 used by a FAX machine. The MFP 101 is connected to a management server 102 and to PCs 103, 104 via the network 105. The management server 102, which is a server that remotely manages the MFP 101, periodically exchanges management information with the MFP 101 via the network 105. The PC 103 and PC 104, which have printer drivers installed for printing on the MFP 101, periodically inquire about the status of the MFP 101.

[Configuration of MFP 101 and Power Supply Controller 205 in Antecedent Art]

Figure 2:
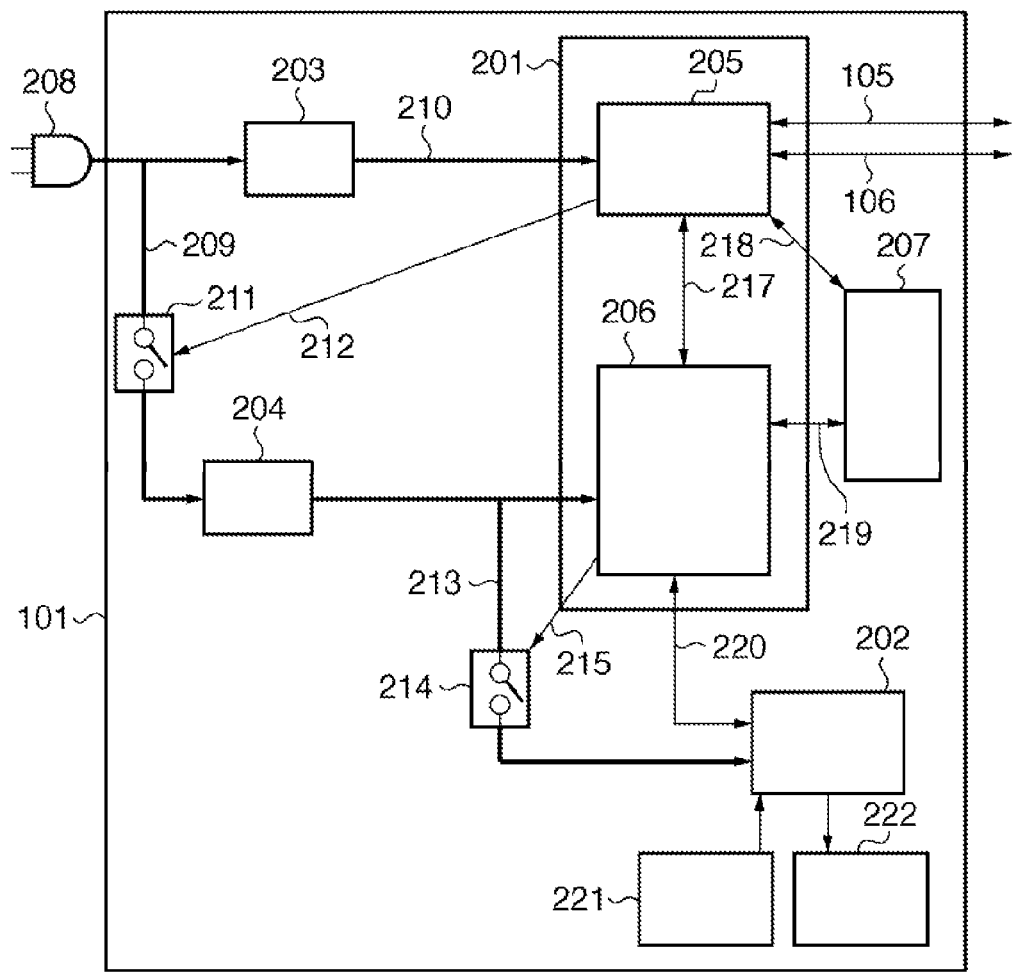
FIG. 2 is a diagram illustrating the configuration of an MFP 101 in antecedent art.

Before explaining the configuration of the present embodiment in detail, explanations will be provided regarding the configuration of the MFP 101 in technology antecedent to the embodiment. FIG. 2 is a block diagram illustrating the configuration of the MFP 101 according to technology antecedent to the present embodiment.

The system control unit 201, which controls the entire MFP 101, transmits and receives packets to and from the network 105, as well as transmits and receives FAX documents on the public line 106. Moreover, the system control unit 201 transmits display information to an operator panel 207 and receives key entry input therefrom, effects control over an engine controller 202, as well as transmits and receives image data. The system control unit 201 is operable in a power-saving mode and comprises a power supply controller 205, which is operable in the power-saving mode, and a system controller 206, which is not operable in the power-saving mode.

The power supply controller 205 has power supplied thereto from a second power supply unit 203 through a power cable 210. The second power supply unit 203 outputs a DC voltage whenever an AC plug 208 is inserted in a receptacle outside of the device and mains AC power is supplied through an AC cord 209. The second power supply unit 203 is designed to provide high efficiency for loads in the power-saving mode. This makes it possible to reduce AC-side power consumption in the power-saving mode.

The system controller 206 has power supplied thereto from a first power supply unit 204. The first power supply unit 204 has a circuit configuration permitting disconnection from AC-side input with the help of a mechanical relay 211. In the power-saving mode the power consumption of the first power supply unit 204 is zero because the supply of electric power from the mains AC power supply to the first power supply unit 204 is blocked by the mechanical relay 211. The mechanical relay 211, which serves as the first switching unit, is a relay with a mechanical configuration having mechanical contact points, capable of handling 1-kW level power consumption during operation. The mechanical relay 211 switches between a connected state (exercises control so as to turn the power on) and a disconnected state (exercise control so as to turn the power off) in response to a relay control signal 212 received from the power supply controller 205. It should be noted that the "connected state" is a state, in which the first power supply unit 204 is powered by the mains AC power supply through the AC plug 208. Moreover, the "disconnected state" is a situation, in which the first power supply unit 204 is not powered by the mains AC power supply through the AC plug 208.

The system controller 206, which is connected to the power supply controller 205 via an internal bus 217, transmits and receives network packets and FAX data, as well as receives instructions that cause a return to the power-saving mode and transmits instructions for transitioning to the power-saving mode.

In order to activate the engine controller 202 when printing, scanning, etc., the system controller 206 uses a relay control signal 215 to cause an engine relay 214 to transition from a disconnected state to a connected state. Also, when printing, image data is transmitted to a printing unit 222 through an engine interface cable 220 and printing is carried out on recording paper. Furthermore, image data representing an original scanned in a scanner 221 is received during scanning.

Figure 3:
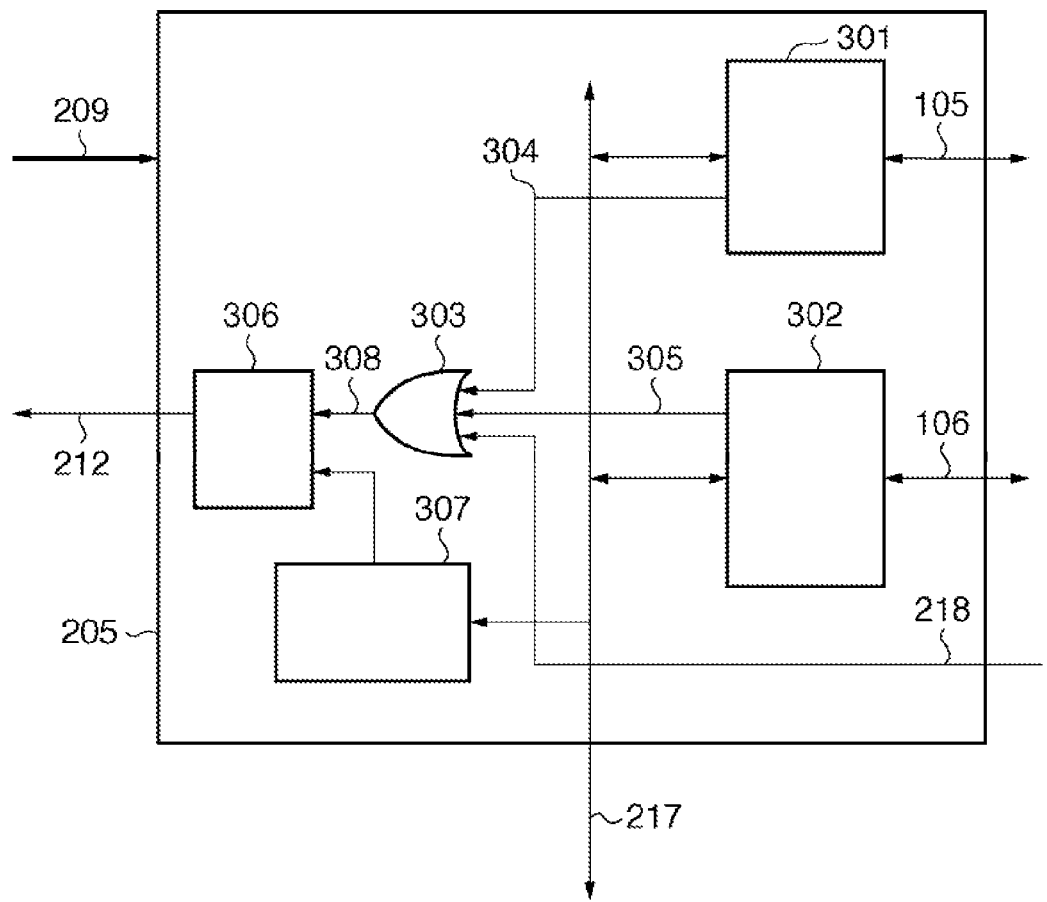
FIG. 3 is a diagram illustrating the configuration of a power supply controller 205 in antecedent art.

FIG. 3 is a block diagram illustrating the internal configuration of the power supply controller 205 illustrated in FIG. 2, which is used in antecedent art. The power supply controller 205 comprises mutually interconnected trigger detection units 301 and 302, an OR circuit 303, a latch 306, and a register 307.

Based on the characteristics of a packet received via the network 105, the trigger detection unit 301 decides whether the packet is a trigger for returning from the power-saving mode to the normal mode and, if it decides that it is a trigger, outputs a trigger signal 304 to the OR circuit 303. Moreover, upon detection of a FAX arriving via the public line 106, the trigger detection unit 302 outputs a trigger signal 305 to the OR circuit 303. Furthermore, if a power button provided on the operator panel 207 is pressed, the OR circuit 303 accepts a corresponding trigger signal 218 as input. The OR circuit 303, which forms part of the power supply controller 205, generates a startup trigger signal 308 by performing a logical OR operation on the trigger signals 304, 305, and 218.

When the MFP 101 operates in the power-saving mode and the startup trigger signal 308 changes, the state of the latch 306 changes and a relay control signal 212 used to switch the mechanical relay 211 to an ON state is outputted to the mechanical relay 211. In response to the received relay control signal 212, the mechanical relay 211 transitions to an ON state, as a result of which the MFP 101 returns from the power-saving mode to the normal mode. When the MFP 101 operates in the normal mode, the state of the latch 306 is changed by writing the system controller 206 to the register 307 via the internal bus 217.

It should be noted that situations, in which the system controller 206 writes to the register 307 include, for instance, the following situations. A packet intended to cause a transition from the normal mode to the power-saving mode is received by the system controller 206 from the client PCs 103 or 104; and a state, in which the MFP 101 is not used, including e.g. receipt of network packets and FAX data by the MFP 101, user operations via the operator panel 207, etc., has continued for a fixed time period.

The latch 306 sends the relay control signal 212 to the mechanical relay 211 and causes the mechanical relay 211 to transition to an off (disconnected) state. As a result, the device transitions to the power-saving mode.

[Configuration of MFP 101 and Power Supply Controller 205 in Present Embodiment]

Figure 5:
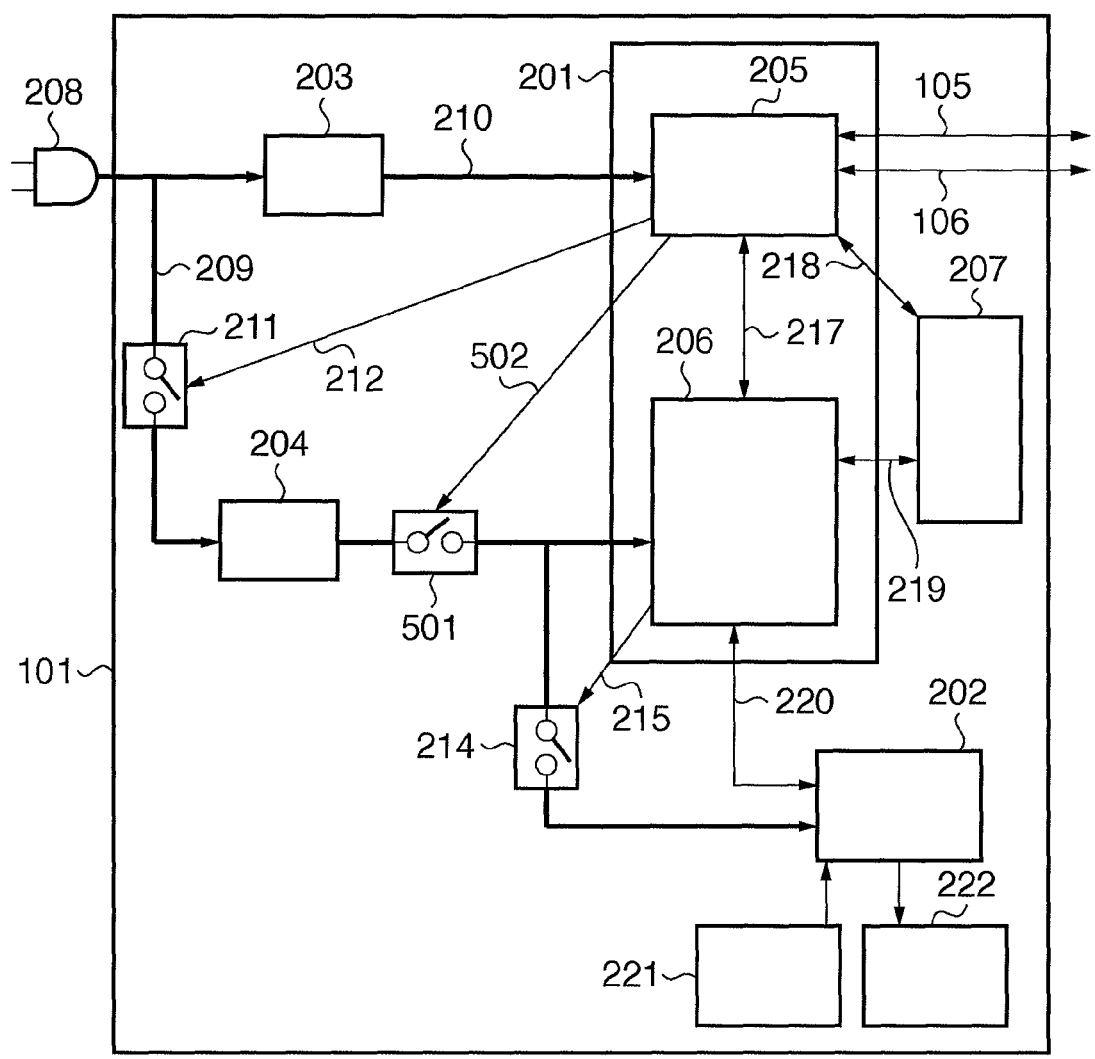
FIG. 5 is a diagram illustrating the configuration of an MFP 101 in a first embodiment.

FIG. 5 is a block diagram illustrating the configuration of an MFP 101 in a first embodiment. In addition to the configuration of FIG. 2, which illustrates antecedent art, the MFP of the present embodiment comprises a semiconductor relay 501 used as a second switching unit capable of disconnecting power supplied from the first power supply unit 204. In consideration of the life of the mechanical relay 211, the semiconductor relay 501 is turned off when disconnection is impossible. It should be noted that a semiconductor relay is used as the second switching unit because a semiconductor relay usually has a sufficiently longer life in terms of the number of times it is turned on and off. However, a mechanical relay may also be used as the second switching unit instead of a semiconductor relay.

The control signal 502 is controlled by the power supply controller 205. The mechanical relay 211 and the semiconductor relay 501 can both be used to disconnect the electric power supplied to the system controller 206 during transition from the normal mode to the power-saving mode. In consideration of the life of the mechanical relay 211, the power supply controller 205 may selectively turn off either the mechanical relay 211 or relay 501. Even when the semiconductor relay 501 is turned off, power is still consumed in the first power supply unit 204 while the mechanical relay 211 is turned on. If conditions allowing for the mechanical relay 211 to be switched to a disconnected state are satisfied, the power supply controller 205 minimizes power consumption by turning the mechanical relay 211 off.

Figure 6:
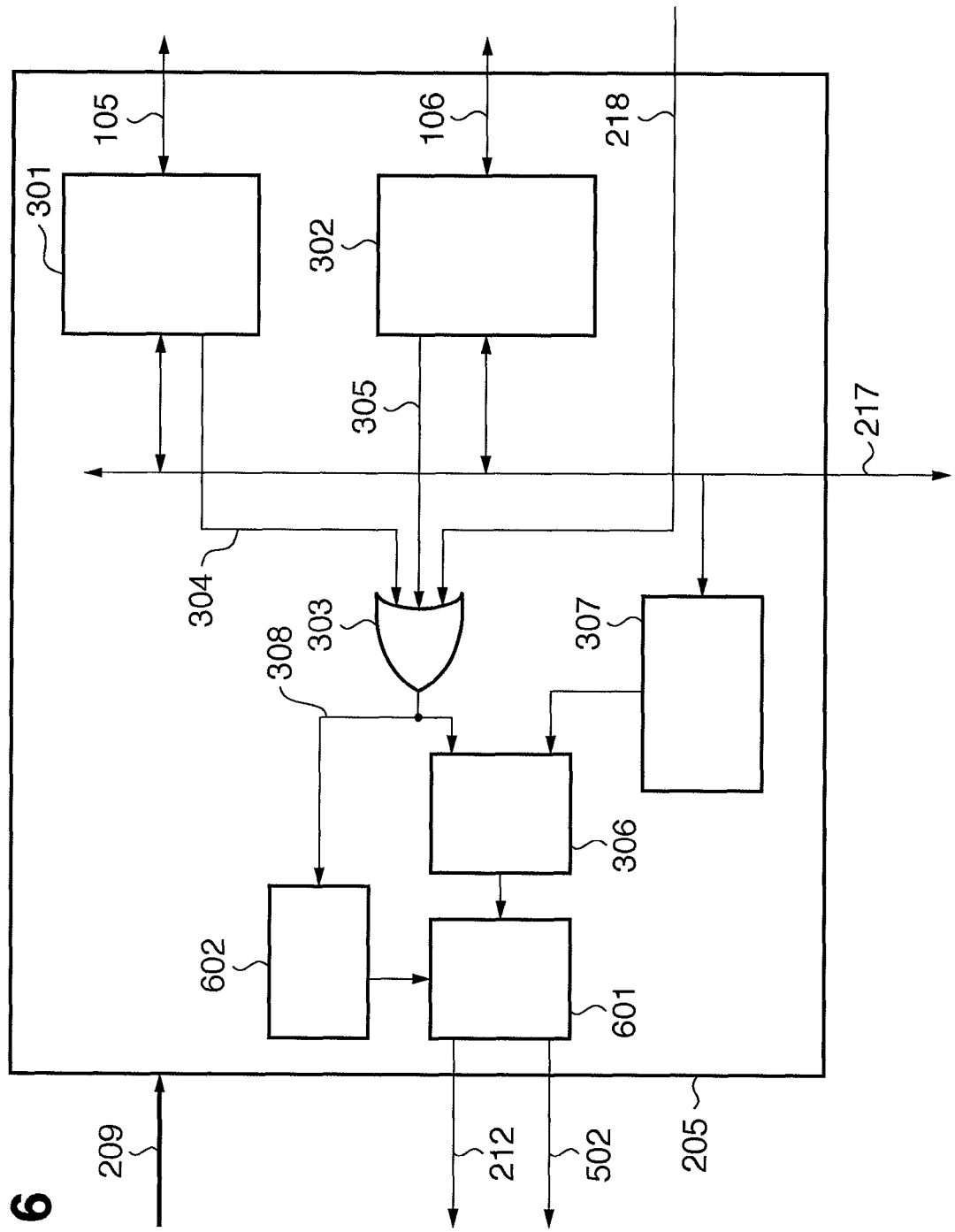
FIG. 6 is a diagram illustrating a power supply controller in the first embodiment.

FIG. 6 is a block diagram illustrating the internal configuration of the power supply controller 205 in the first embodiment. The difference from the power supply controller 205 illustrated in FIG. 3 consists in the addition of a selector 601 and a timer 602, which generates the selection signal of the selector 601, to the output of the latch 306. The timer 602, which is reset when the startup trigger signal 308 indicates a return from the power-saving mode or when electrical power is supplied to the second power cable 209, counts down a prescribed time period (a fixed time period), which is set as a predetermined condition. Determination is then made to see whether the predetermined condition has been satisfied, i.e. whether the prescribed time period has elapsed, and the result is inputted to the selector 601. When the output signal of the latch 306, which indicates the presence/absence of the power-saving mode, indicates that it is not in the power-saving mode, the selector 601 activates the mechanical relay control signal 212 and semiconductor relay control signal 502 to place both relays in a connected state. If the output signal of the latch 306 indicates that it is in the power-saving mode, the output is changed according to the value of the timer 602.

FIG. 12 is a diagram illustrating an input/output relationship in the selector 601. When the latch 306 is inactive, the system control unit 201 operates in the normal mode. The mechanical relay 211 and semiconductor relay 501 are turned on. When the latch 306 is active, the system control unit 201 operates in the power-saving mode and the state of the relays varies depending on the value of the timer 602. In consideration of the life of the mechanical relay 211, the mechanical relay 211 is placed in an ON state and the semiconductor relay 501 is placed in an OFF state (intermediate mode) when the output of the timer 602 is inactive, i.e. if the prescribed time period has not passed. When the output of the timer 602 is active, i.e. upon passage of a fixed time period, the mechanical relay 211 is placed in an OFF state. At such time, the power consumption of the MFP 101 is minimized. If the latch 306 is active and the timer 602 changed from an inactive state to an active state, the mechanical relay 211 is placed in an OFF state, as a result of which the power consumption of the MFP 101 is reduced to a minimum equal to the second power supply unit 203 alone.

[Configuration of System Controller 206]

FIG. 4 is a block diagram illustrating the internal configuration of the system controller 206. The numeral 401 designates a CPU (processor) executing software in order to exercise overall control over the MFP 101. Because power consumption rises when the CPU 401 is operated, in the power-saving mode, power supply to the CPU 401 is disconnected for power reduction purposes. A memory controller 402, which is connected to the CPU 401, a memory 403, and an internal bus 217, operates as an interface for devices connected to the internal bus 217. By accessing an engine relay controller 404, the CPU 401 outputs a relay control signal 215 used to control the connection/disconnection of electric power to the engine controller 202. Furthermore, by accessing an operator panel controller 405, the CPU 401 receives key entry signals 219 from the operator panel 207 and transmits screen display information. A program memory 406 stores a software program used to start up the CPU 401. A hard disk 407 is accessed by the CPU 401 in order to store software programs, image data, etc.

[MFP Operation]

Various printing, faxing, and copying operations performed by an MFP configured in accordance with the present embodiment are explained below.

(1) Print Job Processing.

The system controller 206 receives print jobs from the client PCs 103 and 104 via the network 105 and sends them to the trigger detection unit 301. Once the received print jobs are saved on the hard disk 407, they are successively converted to bitmap images by the CPU 401. The converted bitmap images are transferred to the printing unit 222 via the engine controller 202. The printing unit 222 forms images on recording paper based on the received image data.

(2) Fax Job Processing.

The MFP 101 is capable of transmitting and receiving images to/from other fax machines via the public line 106. In case of fax transmission, upon detecting a user's input on the operator panel 207, the system controller 206 reads an original transmitted by the scanner 221 and transfers it to the memory 403 through the engine controller 202. In the CPU 401, the image data is read from the memory 403, converted into an image format suitable for fax transmission, and temporarily saved on the hard disk 407. Subsequently, a connection is established between a FAX start-up trigger detection circuit and another fax machine through the public line 106 and the image is transmitted upon connection.

In case of fax reception, when the fax start-up trigger detection circuit detects receipt of a fax, the system controller 206 receives image data from another fax machine through the public line 106. The received data is then saved in the memory 403, converted to a bitmap image in the CPU 401, and saved on the hard disk 407. Subsequently, the image data is transferred to the printing unit 222 through the engine controller 202 and printing unit 222 forms an image on recording paper based on the received image data.

(3) Copy Job Processing.

In case of copy job processing, upon detecting a user's input on the operator panel 207, the system controller 206 reads an original copied by the scanner 221 and temporarily stores on the hard disk 407 via the engine controller 202. Subsequently, the image data is transferred to the printing unit 222 via the engine controller 202. The printing unit 222 forms an image on recording paper based on the received image data.

[Power Supply Control Workflow]

Figure 8:
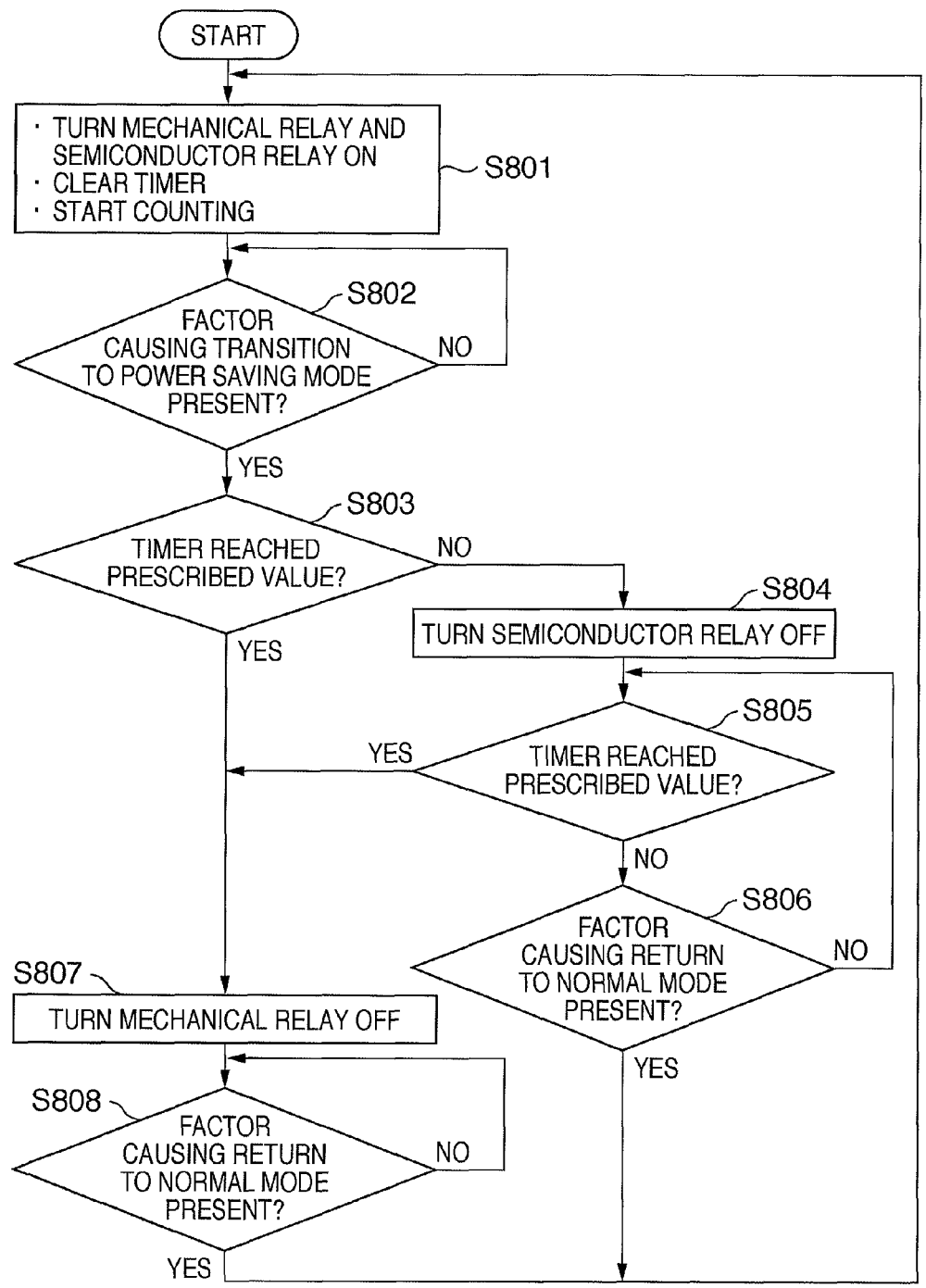
FIG. 8 is a flow chart of power supply control in the first embodiment.

Power supply control processing performed by the MFP 101 of the present embodiment will be explained next. FIG. 8 is a flow chart illustrating power supply control workflow in the system control unit 201 according to the first embodiment.

When the AC plug 208 of the MFP 101 is connected, in S801, the timer 602 is cleared and starts counting while the mechanical relay 211 and semiconductor relay 501 are placed in an ON state.

Next, in S802, the unit remains on standby until a factor that causes a transition to the power-saving mode is generated. If printing, faxing, or copying jobs etc. are initiated in the meantime, these jobs are processed. When a factor that causes a transition to the power-saving mode is detected, the unit advances to S803. In step S803, it is determined whether the count value of the timer 602 has reached the prescribed value and, if it has reached the prescribed value, processing advances to S807, wherein the mechanical relay 211 is placed in an OFF state and a transition from the normal mode to the power-saving mode takes place. In other words, as the output of the timer 602 is activated upon passage of the fixed time period, the selector 601 places the mechanical relay 211 in a disconnected state, thereby minimizing the power consumption of the MFP 101.

Subsequently, in S808, it remains on standby until a factor that causes a return from the power-saving mode to the normal mode is generated and processing is performed again starting from S801 when such a return factor is generated. In S803, if a determination is made that, despite the presence of a factor that causes a transition to the power-saving mode, the timer 602 has not reached the prescribed value, processing advances to S804, and the semiconductor relay 501 is placed in an OFF state. As a result, despite the transition from the normal mode to the power-saving mode, power consumption is not reduced to a minimum because the mechanical relay 211 is not placed in an OFF state. In other words, even though the semiconductor relay 501 is placed in an OFF state, power is still consumed in the first power supply unit 204 while the mechanical relay 211 is in the ON state.

Subsequent to placing the semiconductor relay 501 in an OFF state, processing advances to S805, where a determination is made once again as to whether the timer 602 has reached the prescribed value. In other words, upon placing the semiconductor relay 501 in an OFF state, the unit remains on standby until a predetermined time passes since the moment in time when the mechanical relay and semiconductor relay are placed in an ON state in S801. If the timer 602 has reached the prescribed value, in S807, the mechanical relay is put into an OFF state, and a transition to a state with minimum power consumption occurs. If the timer 602 has not reached the prescribed value, in S806, a determination is made as to whether a factor that causes a return from the power-saving mode to the normal mode is present and processing is repeated starting from S805 when no return factor is present. If there is a return factor, processing advances to S801 once again, the mechanical relay 211 and semiconductor relay 501 are placed in an ON state, and a transition from the power-saving mode to the normal mode occurs.

In this manner, the number of times the mechanical relay 211 is turned on and off can be decreased because the mechanical relay 211 is not put in an OFF state for a fixed time period starting from the beginning of operation in the normal mode. Moreover, if a factor that causes a transition to the power-saving mode is generated within this fixed period of time, the amount of power consumed over this fixed time period can be reduced by placing the semiconductor relay provided downstream of the power supply and upstream of the system controller 206 in an OFF state.

[Time Variation in Power Consumption of MFP 101]

Figure 7:
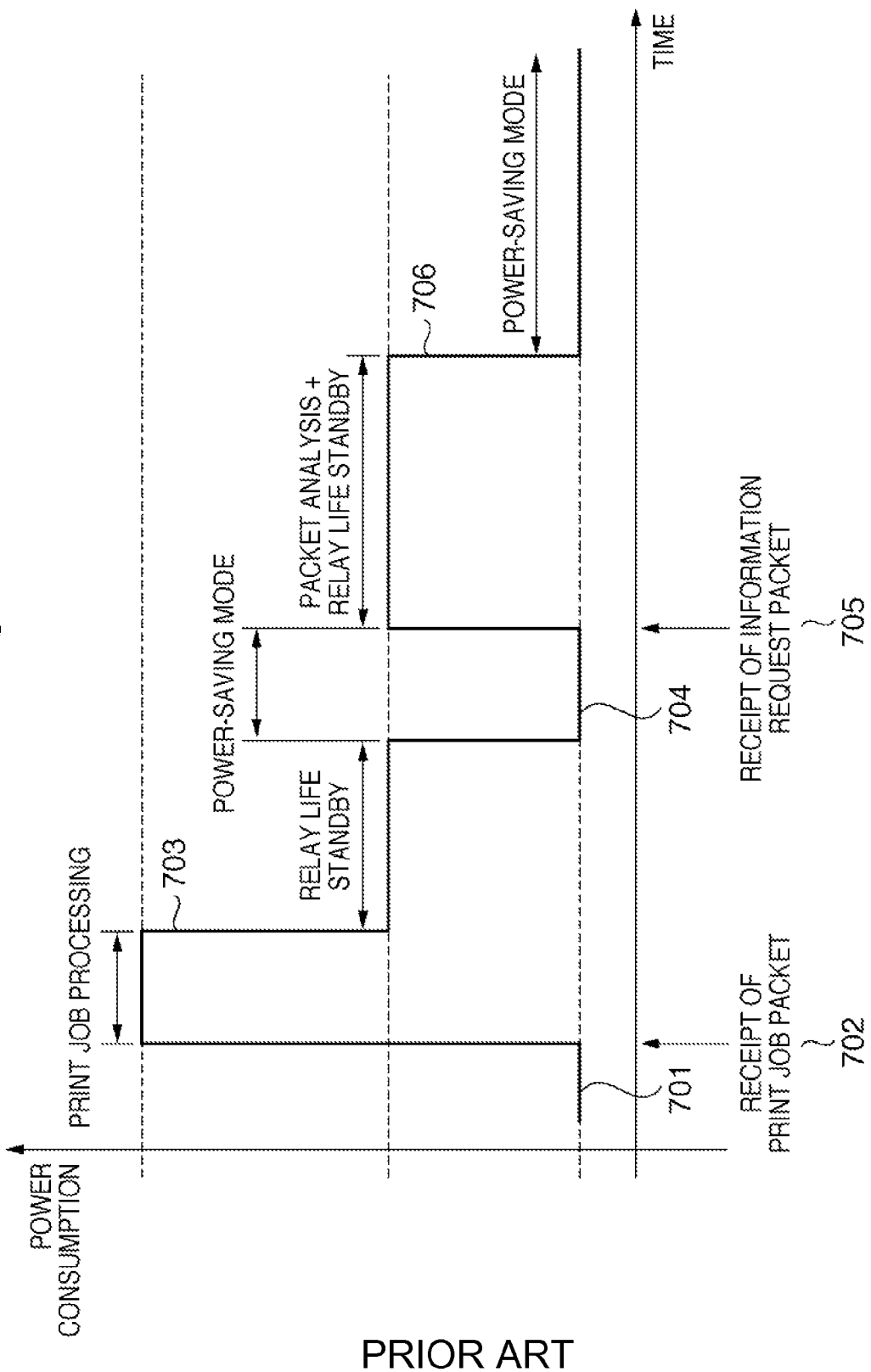
FIG. 7 is a diagram showing time variation in the power consumption of the MFP 101 in antecedent art.
Figure 11:
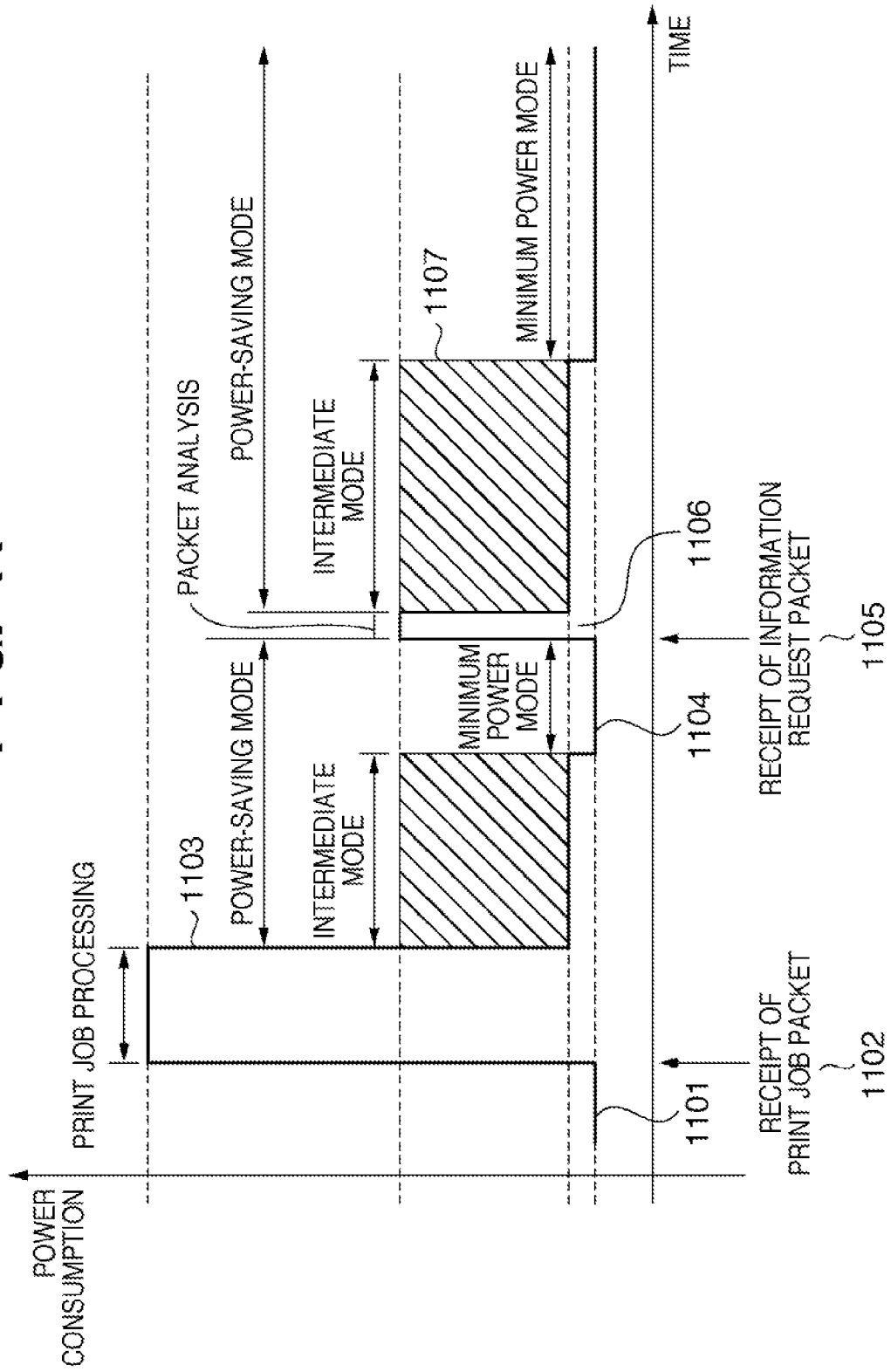
FIG. 11 is a diagram showing time variation in the power consumption of the MFP 101 in the first embodiment.

Here, FIG. 7 and FIG. 11 will be used to explain differences in power consumption between a situation, in which the power supply of the MFP 101 is controlled using the configuration of the antecedent art, and a situation, in which the power supply of the MFP 101 is controlled using the configuration of the present embodiment.

FIG. 7 is a diagram showing time variation in the power consumption of the MFP 101 in antecedent art. During 701, in a power-saving mode, the mechanical relay 211 is placed in an OFF state, only the power supply controller 205 and second power supply unit 203 are energized and power consumption is low.

At point 702, as a result of receiving a packet via the network 105 and power being supplied to the system controller 206, the MFP 101 returns from the power-saving mode to the normal mode. If, as a result of packet analysis in the CPU 401, it is determined that this is a print job, the system controller immediately places the relay 214 in an ON state and supplies power to the engine controller 202. For this reason, power consumption reaches its maximum. At point 703, print job processing ends and the device enters a standby state (with only the relay 214 turned off). In consideration of the life of the mechanical relay 211, the normal mode may be maintained for a fixed time period without immediately transitioning to the power-saving mode. At point 704, the CPU 401 detects that the fixed time period has passed and places the mechanical relay 211 in an OFF state, thereby transitioning from the normal mode to the power-saving mode.

At point 705, the trigger detection unit 301 detects a packet and controls the mechanical relay 211 so as to turn the relay on, thereby transitioning from the power-saving mode to the normal mode. As a result of packet analysis in the system controller 206, it is determined that this is a device information request packet and a response packet is transmitted to the sender of the packet. Here, no power is supplied to the engine controller 202, as a result of which power consumption is lower than during job processing but higher than in the power-saving mode.

In the same manner as at point 703, no transition to the power-saving mode occurs at this point in consideration of the life of the mechanical relay 211. At point 706, the CPU 401 detects that the fixed time period has passed and disconnects the mechanical relay 211, thereby transitioning to the power-saving mode.

FIG. 11 is a diagram showing time variation in the power consumption of the MFP 101 in the present embodiment. Initially, at point 1101, the MFP 101 operates in the power saving mode while the mechanical relay 211 and semiconductor relay 501 are in an OFF state. In other words, this the state with the lowest power consumption, in which only the second power supply unit 203 and power supply controller 205 are energized.

Next, at point 1102, when the trigger detection circuit 301 in the power supply controller 205 determines that the packet received via the network 105 is a print job processing request, a startup trigger signal 308 is outputted from the OR circuit 303 in the power supply controller 205. Furthermore, in response thereto, the state of the latch 306 changes and a relay control signal 212 is outputted to the mechanical relay 211. In response to the received relay control signal 212, the mechanical relay 211 transitions to an ON state, as a result of which the device returns from the power-saving mode to the normal mode. Furthermore, if, as a result of packet analysis in the CPU 401, it is established that this is a print job, the system controller 206 immediately places the relay 214 in an ON state and also supplies power to the engine controller 202. For this reason, power consumption reaches its maximum.

The end of the print job at point 1103 serves as a factor that causes a transition to the power-saving mode. However, even if the processing of the print job is over, in consideration of the life of the mechanical relay 211, the mechanical relay 211 is not placed in an OFF state until a fixed time period (e.g. 15 min) elapses and only the semiconductor relay 501 and relay 214 are placed in an OFF state (intermediate mode of the power-saving mode). In contrast to the antecedent art of FIG. 7, no power is supplied to the system controller 206, as a result of which power consumption can be reduced by the amount indicated by the hatched units. As far as the power supply of the engine controller 202 is concerned, if it is desirable to shorten the startup time upon receipt of a print job, the mechanical relay 214 may be maintained in the ON state during standby.

When the timer 602 detects at point 1104 that the fixed time period has passed, the mechanical relay 211 is placed in an OFF state (minimum-power mode of the power-saving mode). When the trigger detection unit 301 detects a packet at point 1105, the mechanical relay 211 is placed in an ON state, thereby returning from the power-saving mode to the normal mode. If, as a result of packet analysis in the system controller 206, it is determined that this is an information request packet addressed to the MFP 101, a response packet is transmitted to the sender of the packet. Here, no power is supplied to the engine controller 202, as a result of which power consumption is lower than during print job processing but higher than in the power-saving mode. When the response packet is transmitted, during time 1106, in consideration of the life of the mechanical relay 211, the mechanical relay 211 is not placed in an OFF state until a fixed time period elapses and, on the other hand, the semiconductor relay 501 and relay 214 are placed in an OFF state (intermediate mode of the power-saving mode). In contrast to the antecedent art of FIG. 7, no power is supplied to the system controller 206, as a result of which power consumption can be reduced by the amount indicated by the hatched units. At time 1107, the CPU 401 detects that the fixed time period has passed and disconnects the mechanical relay 211, thereby transitioning to minimum-power mode of the power-saving mode.

Second Embodiment

In the second embodiment, explanations are provided regarding an example, in which the count value of the timer 602 described in the first embodiment is varied. When the count value is varied, the count value may be generated using hardware, however, here explanations are provided regarding an example, in which calculations are carried out by the CPU 401 serving as a regulating unit. Using the CPU 401 for calculations makes it easier to perform complicated calculations.

Figure 9:
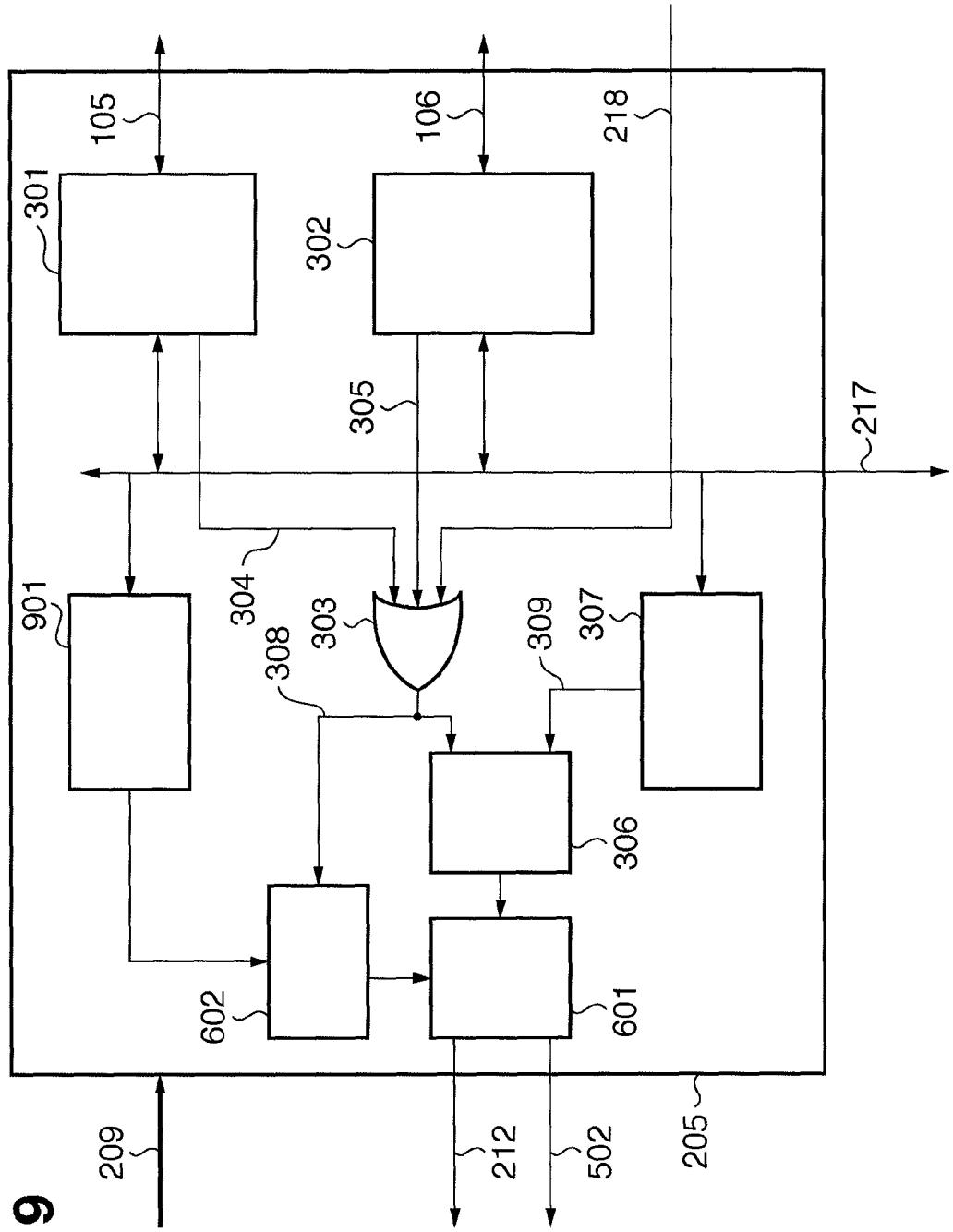
FIG. 9 is a diagram illustrating a power supply controller in a second embodiment.

FIG. 9 is a block diagram illustrating the configuration of the power supply controller 205 in the second embodiment. While being nearly identical to the one of FIG. 6, which was described in the first embodiment, it is also provided with a register 901 for adjusting the count value of the timer 602. Values can be written by the CPU 401 to the register 901 via an internal bus 217. A timer 602 counts until it reaches the count value written to the register 901.

Figure 10:
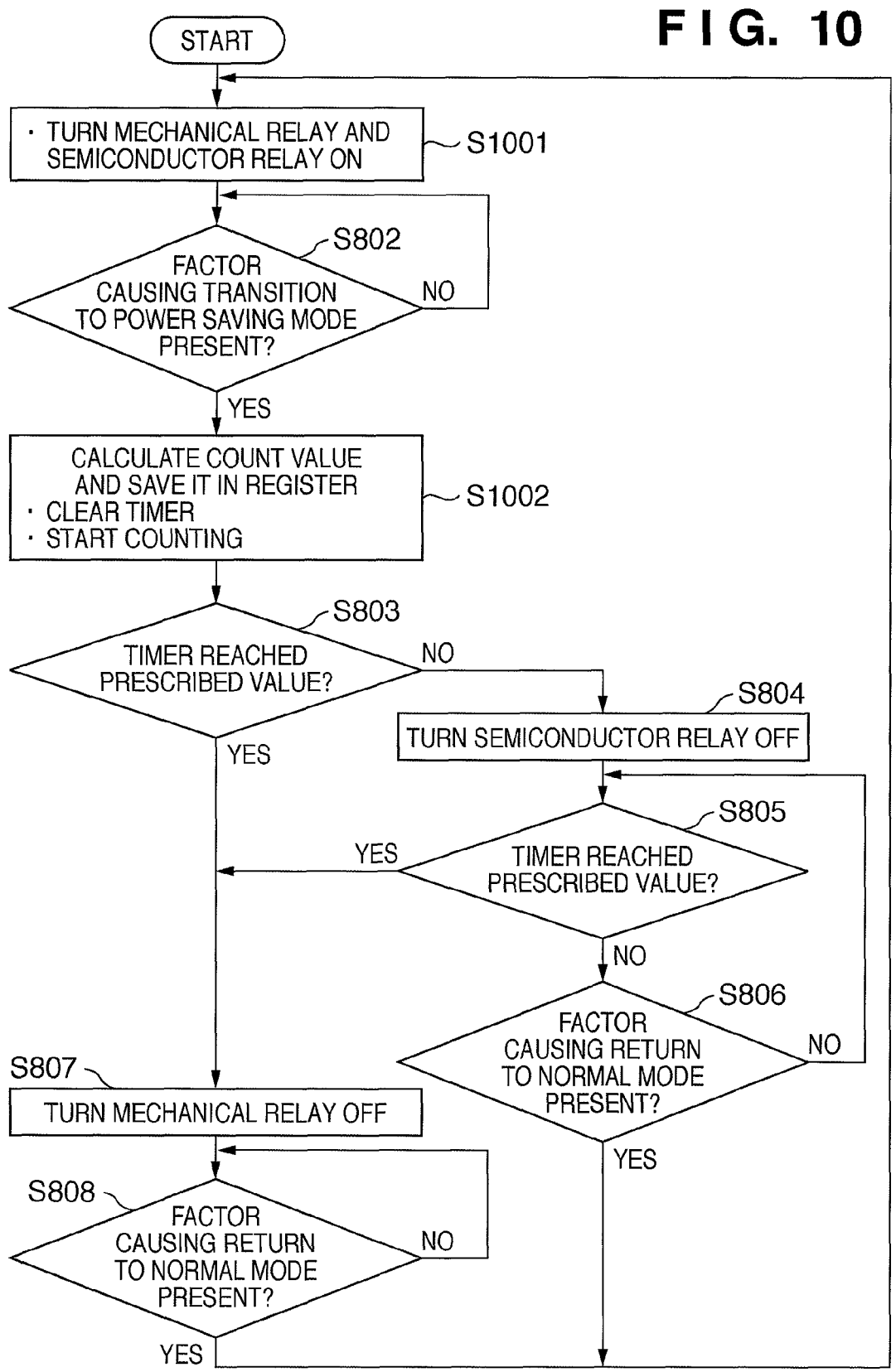
FIG. 10 is a flow chart of power supply control in the second embodiment.

FIG. 10 is a flow chart illustrating the flow of processing in the second embodiment. While there are almost no differences in comparison with the flow chart of FIG. 8 described in the first embodiment, counting does not start in S1001 when the mechanical relay 211 and semiconductor relay 501 are controlled so as to turn the relays on. Instead, after a trigger for transitioning to the power-saving mode is detected in S802, in S1002, a count value is calculated by the CPU 401 and stored in the register 901.

Since the count value is determined by software using the CPU 401, no counter is used when turning the power on or returning from the power-saving mode, and it is sufficient to calculate the count remaining immediately before transitioning to the power-saving mode and save it to the register 901. Values necessary for calculation are stored on the hard disk 407 as needed. Since the hard disk 407 can hold values even when the power is disconnected, it is also possible to store the number of times relays were switched on and off in the past, as well as the moments in time when the switching took place, etc.

FIG. 13 is a diagram presenting a summary of the algorithms used in the calculation of count values, the values to be stored used in Application Examples 1-4, as well as values and properties used for calculation in the configuration of the second embodiment.

Application Examples 1-4 are explained below.

Application Example 1

Counting for Fixed Time Period after Previous Power-On of Mechanical Relay 211

This example represents an implementation of the same algorithm as in the first embodiment, but without the timer 602. In other words, the CPU 401 determines the counter value. There are two values stored:

T1: the previous moment when the mechanical relay 211 was controlled so as to turn the relay on, and T2: the minimum time (usually a fixed value), during which the mechanical relay 211 is turned on, with the counter value calculation performed as shown below.

Counter value=$T2-$(current moment$-T1$).

(which is set to "0" when the result is negative).

This is an algorithm, in which the interval used for switching the mechanical relay 211 on and off is a fixed time period. When the interval of the trigger used for transitioning to the power-saving mode is longer in comparison with the fixed time period T2, a margin relative to the life of the mechanical relay 211 is produced, accumulating in units of power-on intervals of the mechanical relay 211. In this embodiment, the counter value is calculated based on software processing by the CPU 401. In order to alleviate margin accumulation, the fixed time period T2 may be varied depending on the time zone, day of the week, etc.

Application Example 2

Counting for Fixed Time Period Since n-th Previous Power-On of Mechanical Relay 211

Application Example 2 is an extension of the algorithm of Application Example 1. The two stored values are as follows.

T3: the moment of the n-th previous power-on of the mechanical relay 211.

T4: the minimum time (fixed value), during which the mechanical relay 211 is turned on.

The formula used to calculate the counter value is as follows.

$$\text{Counter value} = n \times T4 - (\text{current moment} - T3)$$

(set to "0" when negative).

In contrast to Application Example 1, in which some margin is accumulated for each power-on interval of the mechanical relay 211, the present application example is different in that the accumulation takes place in units of n times. It is a feature of this example that there is no margin accumulation during n power-ons.

Application Example 3

Setting Number of Times Mechanical Relay 211 can be Turned Off Over a Fixed Period of Time to within a Fixed Value Under this scheme, the number of times the mechanical relay 211 is controlled so as to turn the relay on or the number of times the relay is controlled so as to turn the relay off over a predetermined time period is counted and the prescribed time period is adjusted in accordance with the counted value.

Under this scheme, the number of power-ons of the mechanical relay 211 over a predetermined time period is restricted in consideration of the life of the mechanical relay 211. The four stored values are as follows.

T5: the number of times the mechanical relay 211 is turned on over a predetermined time period.

T6: the maximum value (usually a fixed value) for power-ons of the mechanical relay 211 over a fixed time period.

T7: the moment, at which the T5 count started.

T8: the period (usually a fixed value), during which the number of power-ons of the mechanical relay 211 is counted.

The formula used to calculate the counter value is as follows.

When current moment≧T7+T8, set current moment to T7, T5=0.

When T5<T6, counter value=0 (immediately transition to minimum-power mode of the power-saving mode).

When T5≧T6, counter value=T7+T8−current moment.

Here, the fixed time period T8, e.g. one hour or one day. In situations, wherein the number of power-ons of the mechanical relay 211 in the first half of the fixed time period T8 reaches the maximum value T6, sometimes no transition to the minimum-power mode of the power-saving mode takes place until the end of the fixed time period T8. In order to alleviate this problem, the period, as well as the number of times the relay can be turned off, may be varied depending on the cumulative number of relay power-ons.

Application Example 4

Calculating Possible Disconnect Time Period Based on Cumulative Number of Power-Ons Application Example 4 represents a method suitable for reducing margin accumulation relative to the life of the mechanical relay 211. The three stored values are as follows.

T9: the moment of the initial power-on (moment when the use of the relay begins).

T10: the cumulative number of relay power-ons.

T11: a time table for the number of relay power-ons or relay power-on interval.

The formula used to calculate the counter value is as follows.

The time interval until the next moment when the relay can be turned off is T12=T10×T11, or see table.

$$\text{Counter value} = T12 - (\text{current moment} - T9).$$

with the counter value being "0" if the result is negative.

In other words, the CPU, which serves as a regulating unit, regulates the prescribed time period depending on the time elapsed since the beginning of use of the device. This scheme also makes it possible to set margin accumulation to a low level and has the advantage of permitting transitioning to the minimum-power mode of the power-saving mode from the beginning even if operation in the normal mode takes a short time when the cumulative number of relay power-ons is small. Even if the number of relay power-ons is high, it is possible to configure it so as to avoid excessive margin.

The term "margin", as used herein, refers to the either of the following.

Absence of margin when the number of power-ons grows at a pace, at which the power-on life of the relay (for instance, 1,000,000 times) is exhausted at a point in time when the expected device life (e.g. if it is claimed to be 5 years in a catalog, a double of 10 years=87,600 hrs) elapses.

Presence of margin in case of a pace that does not exhaust the life of the relay.

Other Embodiments

Regardless of the detailed explanations provided above with respect to the embodiments of the present invention, the present invention may be applied to a system composed of multiple devices, as well as applied to an apparatus constituted by a single device.

It should be noted that the present invention can be achieved by directly or remotely supplying a software program implementing the functionality of the above-described embodiments to a system or apparatus and allowing the computer of the system or apparatus to read and execute the supplied program code. Therefore, the functional processing of the present invention is implemented using a computer and the program code installed on the computer is itself within the technical scope of the present invention.

In such a case, the type of the software program, such as object code, interpreter-executed programs, script data supplied to the OS, etc., is irrelevant so long as it possesses the functionality of the software program.

Recording media used to supply the software program may include, for instance, Floppy™ disks, hard disks, optical disks, and magneto-optical disks. In addition this could be an MO, a CD-ROM, a CD-R, a CD-RW, a magnetic tape, a non-volatile memory card, a ROM, or a DVD (DVD-ROM, DVD-R), etc.

In addition, also contemplated are methods of use, in which a browser on a client PC is used to connect to an internet website and the software program of the present invention, or, furthermore, a file with an automatic installation feature, is downloaded from onto a recording medium such as a hard disk. Furthermore, this can also be implemented by dividing the program code constituting the software program of the present invention into multiple files and downloading the respective files from different home pages. In other words, WWW servers permitting multiple users to download a software program used to implement the functional processing of the present invention on a computer are also included in the scope of the present invention.

Moreover, the software program of the present invention may be encrypted, stored on a recording medium such as a CD-ROM, etc., and distributed to users. It can be implemented by allowing users who satisfy certain conditions to download key information used for decryption from a home page via the Internet and use this key information to execute the encrypted program and install it on a computer.

Moreover, the functionality of the above-described embodiments can also be implemented if an OS etc. running on a computer partially or entirely carries out actual processing based on the instructions of the software program.

Furthermore, cases, wherein the software program of the present invention is written to a memory provided in an expansion unit connected of a PC and the CPU etc. provided in the expansion unit partially or entirely executes actual processing, are also included in the scope of the present invention.

The present invention enables further reduction in power consumption while ensuring the useful life of the switch used for switching to the power-saving mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-177557 filed on Jul. 5, 2007, which is hereby incorporated by reference herein in its entirety.

What is claimed is:

1. A power supply control apparatus comprising:
a first power supply configured to supply electric power to a first load and a second load based on electric power supplied from an external power supply;
a first switching unit configured to switch a first state of supply of electric power from the external power supply to the first power supply, wherein the first state is an ON state or an OFF state;
a second switching unit configured to switch a second state of supply of electric power from the first power supply to the first load, wherein the second state is an ON state or an OFF state;
a third switching unit configured to switch a third state of supply of electric power from the first power supply to the second load, wherein the third state is an ON state or an OFF state; and
a control unit configured to control the first switching unit, second switching unit and the third switching unit,
wherein, in a case that a factor for a power-saving state, where the first power supply does not supply electric power to the first load and the second load, is satisfied, the control unit controls:
if an elapsed time period, for which the first switching unit has switched the first state to the ON state, has reached a prescribed time period, the first switching unit to switch the first state to the OFF state, and
if the elapsed time period has not reached the prescribed time period, the second switching unit to switch the second state to the OFF state, and the third switching unit to switch the third state to the OFF state.

2. The power supply control apparatus according to claim 1, wherein, in a case that the factor for the power-saving state is satisfied, the control unit, if the elapsed time has not reached the prescribed time period, controls the second switching unit to switch the second state to the OFF state and controls the third switching unit to switch the third state to the OFF state, and thereafter, if the elapsed time has reached the prescribed time period, further controls the first switching unit to switch the first state to the OFF state.

3. The power supply control apparatus according to claim 1, wherein, after the power supply control apparatus has transitioned to the power-saving state, in response to generation of a factor causing a return from the power-saving state, the control unit further controls the first switching unit to switch the first state to the ON state, controls the second switching unit to switch the second state to the ON state, and controls the third switching unit to switch the third state to the ON state.

4. The power supply control apparatus according to claim 1, wherein the first switching unit is a relay switch and the second switching unit is a semiconductor switch.

5. The power supply control apparatus according to claim 1, further comprising a second power supply configured to supply electric power to the control unit, even if the factor for the power-saving state is satisfied.

6. The power supply control apparatus according to claim 1, wherein the first load is a system control unit which controls a system of the power control apparatus.

7. The power supply control apparatus according to claim 1, wherein the second load is an engine control unit which controls a printer or a scanner.

8. A power supply control apparatus comprising:
a first power supply configured to supply electric power to a load based on electric power supplied from an external power supply;
a first switching unit configured to switch a state of supply of electric power from the external power supply to the first power supply, wherein the state is an ON state or an OFF state;
a second switching unit configured to switch a state of supply of electric power from the first power supply to the load, wherein the state is an ON state or an OFF state,
a control unit configured to control the first switching unit and the second switching unit,
a holding unit configured to hold the cumulative number of times the first switching unit has been switched between the ON and the OFF state by the control unit over a predetermined period; and
a setting unit configured to set a prescribed time period based on the cumulative number of times held by the holding unit,
wherein, in a state where the first power supply supplies electric power to the load, in response to generation of a factor causing a transition to a power-saving state where the first power supply does not supply electric power to the load, the control unit controls:
if an elapsed time period, for which the first switching unit has switched the state of supply of electric power from the external power supply to the first power supply to an ON state, has reached the prescribed time period, the first switching unit to switch the state of supply of electric power from the external power supply to the first power supply to an OFF state, and
if the elapsed time period has not reached the prescribed time period, the second switching unit to switch the state of supply of electric power from the first power supply to the load to an OFF state.

* * * * *